(12) United States Patent
Kuwana et al.

(10) Patent No.: US 6,614,669 B2
(45) Date of Patent: Sep. 2, 2003

(54) POWER SUPPLY STARTING SYSTEM

(75) Inventors: Isamu Kuwana, Kawagoe (JP); Hiroyuki Suzuki, Saitama (JP)

(73) Assignees: Fujitsu Limited, Kawasaki (JP); Shindengen Electric Manufacturing Co. Ltd, Tokyo (JP)

( * ) Notice: Subject to any disclaimer, the term of this patent is extended or adjusted under 35 U.S.C. 154(b) by 0 days.

(21) Appl. No.: 10/356,924

(22) Filed: Jan. 30, 2003

(65) Prior Publication Data
US 2003/0123266 A1 Jul. 3, 2003

Related U.S. Application Data

(63) Continuation of application No. PCT/JP00/05899, filed on Aug. 30, 2000.

(51) Int. Cl.[7] ............................................... H02M 3/00
(52) U.S. Cl. ........................................ 363/49; 323/901
(58) Field of Search ................................. 323/267, 272, 323/901; 363/49, 65

(56) References Cited

U.S. PATENT DOCUMENTS 4,122,513 A * 10/1978 Takahashi et al. .......... 323/282
5,267,135 A * 11/1993 Tezuka et al. ............... 363/49

FOREIGN PATENT DOCUMENTS

JP 4-069057 3/1992
JP 9-154275 6/1997

* cited by examiner

Primary Examiner—Michael Sherry
Assistant Examiner—Gary L. Laxton
(74) Attorney, Agent, or Firm—Katten Muchin Zavis Rosenman

(57) ABSTRACT

A power supply starting system which is capable of preventing faulty starting from being caused at the time of simultaneous startup and thus is improved in quality and reliability. Voltage converters each transform an input reference voltage and supply the transformed voltage to a load element. Simultaneous start signal generator generates a simultaneous start signal for simultaneously starting the voltage converters. Potential difference detector detects a potential difference between the input reference voltages. Forced starting unit inactivates the simultaneous start signal if the potential difference is detected, and forcedly starts the voltage converters after the potential difference becomes insignificant.

2 Claims, 6 Drawing Sheets

POWER SUPPLY STARTING SYSTEM

This application is a continuing application, filed under 35 U.S.C. §111(a), of International Application PCT/JP00/05899 filed on Aug. 30, 2000.

BACKGROUND OF THE INVENTION (1) Field of the Invention

The present invention relates to a power supply starting system, and more particularly, to a power supply starting system for starting device power units.

(2) Description of the Related Art

Power supply schemes for communications equipment include a convert-and-supply scheme wherein commercial power is received, converted, and then supplied to loads. This is a scheme for converting main power into separate power supplies of relatively small capacity. In an electronic exchange or the like, for example, DC/DC converters are used to convert a direct-current voltage, which is mainly at 48 V, to ±5 V, ±12 V, ±24 V, etc. to be supplied to logic elements.

Also, in a communication device constituted by a plurality of units such as an electronic exchange, the power supply system generally takes the form of a distributed power supply system in which each unit is provided with a DC/DC converter.

FIG. 6 shows the configuration of a conventional distributed power supply system. A communication device 100 comprises communication units 101 and 102 which include DC/DC converters 101a and 102a, respectively (each unit may include two or more DC/DC converters). The DC/DC converters 101a and 102a are connected to a battery 3 (commercial power etc.) via lines L1 and L2, respectively.

In this configuration, when the communication units 101 and 102 are to be started simultaneously, a simultaneous start signal K1 is supplied to the DC/DC converters 101a and 102a. In response to the simultaneous start signal K1, the DC/DC converters 101a and 102a start to convert the direct-current voltage from the battery 3 to respective required voltages and supply the same to the elements in their respective units, whereby simultaneous startup of the units is carried out.

In the above conventional distributed power supply system, however, a potential difference occurs between $V_{z1}$ and $V_{z2}$ due to the difference between the impedances Z1 and Z2 of the lines L1 and L2. If the simultaneous start signal K1 is supplied while such a potential difference exists, the DC/DC converters 101a and 102a latch up, resulting in faulty starting of the communication units. In such cases, the starting operation must be performed with the power again switched on, thus giving rise to a problem of poor quality and reliability.

SUMMARY OF THE INVENTION

The present invention was created in view of the above circumstances, and an object thereof is to provide a power supply starting system which is free from faulty starting at the time of simultaneous startup and which is thus improved in quality and reliability.

To achieve the object, there is provided a power supply starting system for starting device power units. The power supply starting system comprises a plurality of voltage converters each for transforming an input reference voltage and supplying a transformed voltage to a load element, and a start control section including simultaneous start signal generating means for generating a simultaneous start signal for simultaneously starting the voltage converters, potential difference detecting means for detecting a potential difference between the input reference voltages, and forced starting means for inactivating the simultaneous start signal if the potential difference is detected, and for forcedly starting the voltage converters after the potential difference becomes insignificant.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
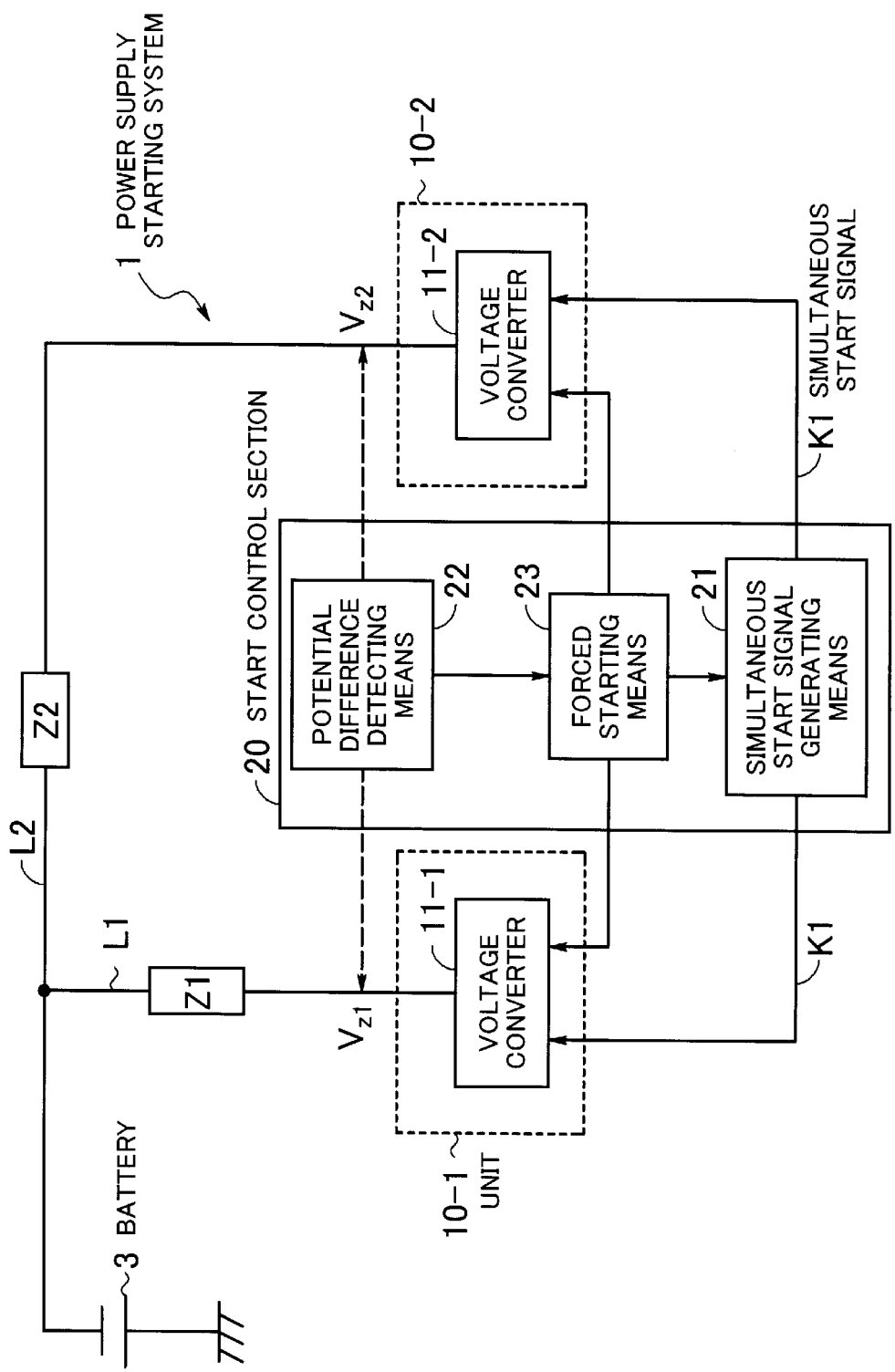
FIG. 1 is a diagram illustrating the principle of a power supply starting system according to the present invention.

Embodiments of the present invention will be hereinafter described with reference to the drawings. FIG. 1 illustrates the principle of a power supply starting system according to the present invention. The power supply starting system 1 comprises voltage converters 11-1 and 11-2 and a start control section 20. The voltage converters 11-1 and 11-2 are connected to a battery 3 (commercial power etc.) via lines L1 and L2, respectively.

The voltage converters 11-1 and 11-2 (corresponding to DC/DC converters), which are arranged in respective units 10-1 and 10-2, each transform an input reference voltage from the battery 3 and supply the transformed voltage to load elements (peripheral logic elements etc.) in the respective units 10-1 and 10-2.

In FIG. 1, only two voltage converters associated with the two units are illustrated for simplicity of explanation. In practice, voltage converters are arranged so as to be associated with a plurality of units actually provided and one unit has at least one voltage converter arranged therein.

The start control section 20 includes simultaneous start signal generating means 21, potential difference detecting means 22, and forced starting means 23. The simultaneous start signal generating means 21 generates a simultaneous start signal K1 for simultaneously starting the voltage converters 11-1 and 11-2, and sends the generated signal to the voltage converters 11-1 and 11-2.

The potential difference detecting means 22 detects a potential difference between the input reference voltages. At the startup of the system, for example, a potential difference occurs between the input reference voltages $V_{z1}$ and $V_{z2}$ applied to the voltage converters 11-1 and 11-2, respectively, due to the difference between the impedances Z1 and Z2 of the lines L1 and L2. The potential difference detecting means 22 detects such a potential difference.

If the potential difference is detected, the forced starting means 23 inactivates the simultaneous start signal K1 (e.g., supplies the simultaneous start signal generating means 21 with an instruction to stop transmission of the simultaneous start signal K1). Then, after the potential difference becomes insignificant, the forced starting means forcedly starts the voltage converters 11-1 and 11-2.

Figure 2:
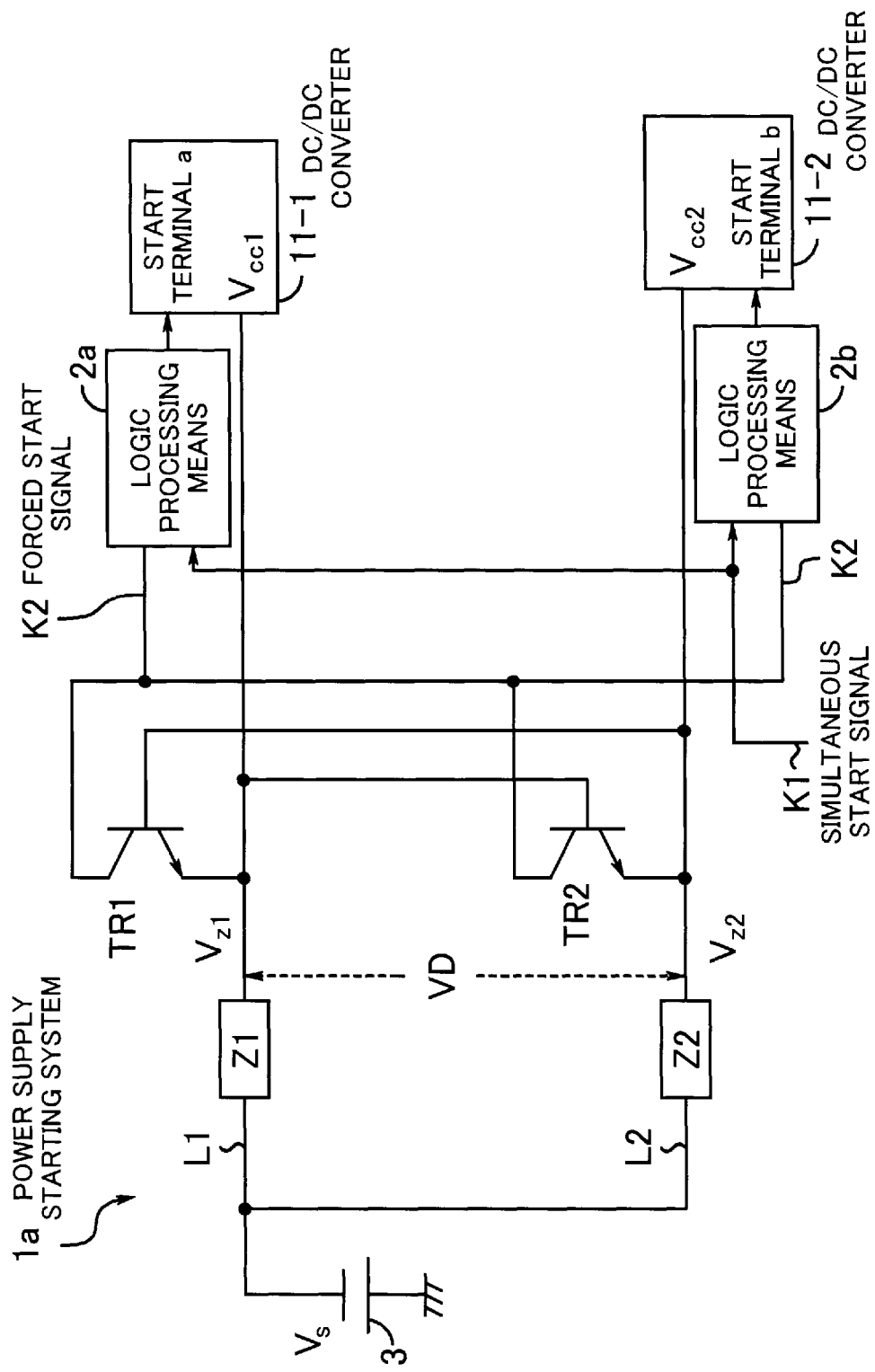
FIG. 2 is a diagram illustrating a configuration according to a first embodiment.

The present invention will be now explained with reference to a specific example in which the power supply starting system 1 is configured using the switching control by means of transistors. FIG. 2 illustrates a configuration according to a first embodiment.

Connections of individual elements of a power supply starting system 1a of the first embodiment will be described first. The negative power supply terminal of the battery 3 is connected to the emitter and base of a transistor TR1, the base and emitter of a transistor TR2, a power supply ($V_{cc1}$) terminal of the DC/DC converter 11-1, and a power supply ($V_{cc2}$) terminal of the DC/DC converter 11-2. The positive power supply terminal of the battery 3 is connected to GND.

The collector of the transistor TR1 is connected to the collector of the transistor TR2 and logic processing means 2a and 2b. The logic processing means 2a and 2b are input with the simultaneous start signal K1, and the output signals therefrom, which are obtained by subjecting the simultaneous start signal K1 and a forced start signal K2 to logical operation, are supplied to start terminals a and b of the DC/DC converters 11-1 and 11-2, respectively. The potential difference between the voltages $V_{z1}$ and $V_{z2}$ is hereinafter referred to as VD.

Figure 3:
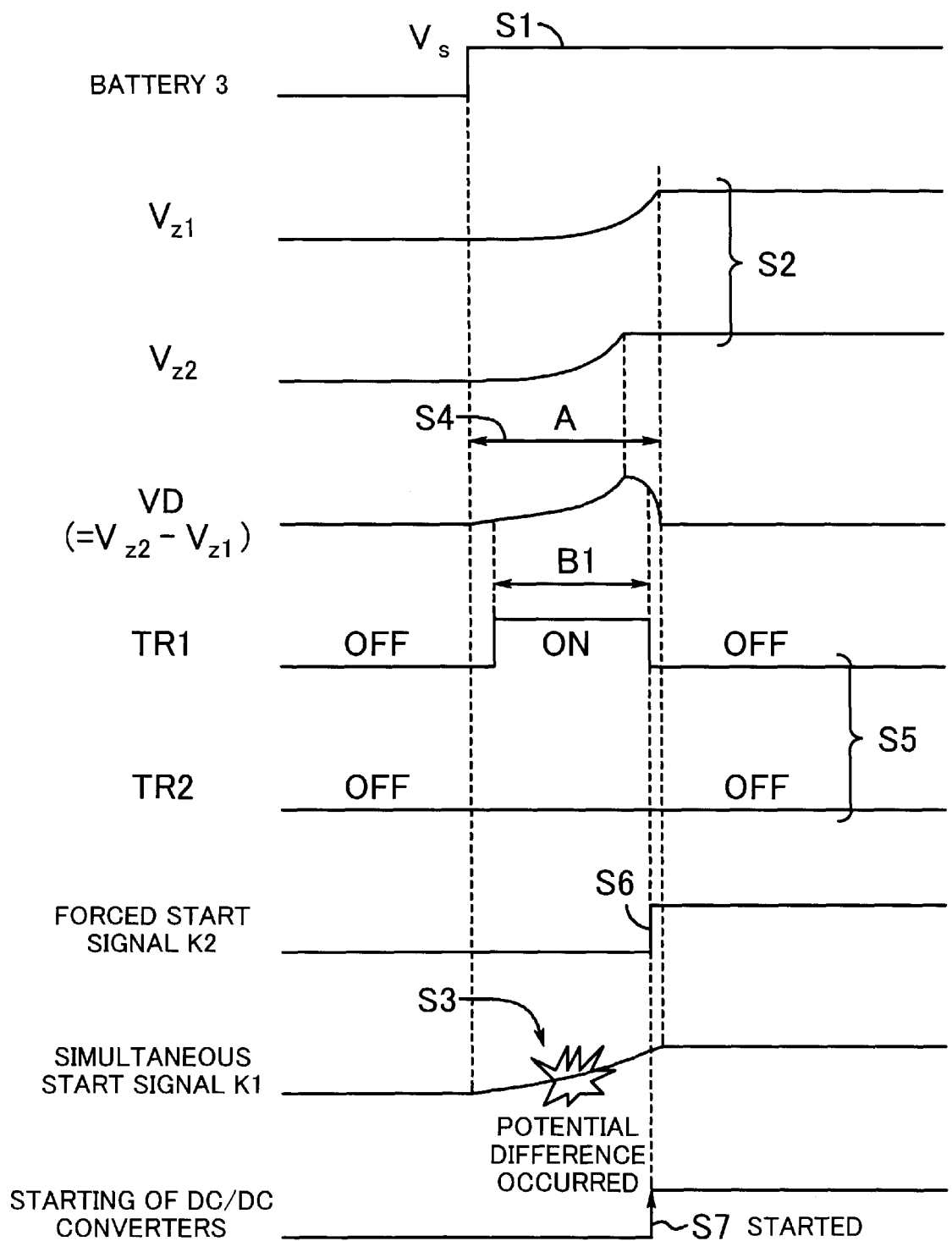
FIG. 3 is a time-based signal waveform chart illustrating operation according to the first embodiment.

Operation will be now described. FIG. 3 is a time-based signal waveform chart illustrating the operation according to the first embodiment, wherein $V_{z1}<V_{z2}$ holds.

[S1] The battery 3 is switched ON ($0 \rightarrow V_s$).

[S2] Since $V_{z1}<V_{z2}$, $V_{z2}$ rises to a constant level earlier than $V_{z1}$.

[S3] The simultaneous start signal K1 starts to rise from the time the battery 3 is switched ON, and reaches a fixed level when $V_{z1}$ reaches the constant level.

[S4] Because of the difference $VD=V_{z2}=V_{z1}$, a potential difference occurs in interval A.

[S5] Due to the potential difference arising from the relation $V_{z1<Vz2}$, the transistor TR1 turns ON during interval B1 while the transistor TR2 remains OFF.

[S6] When the transistor TR1 switches from ON state to OFF state, the forced start signal K2 turns from L to H (enabled at H level).

[S7] In accordance with the result of logical operation on the simultaneous start signal K1 and the forced start signal K2, the logic processing means 2a and 2b start the respective DC/DC converters 11-1 and 11-2.

Where $V_{z1}>V_{z2}$, VD has the opposite polarity and the operations of the transistors TR1 and TR2 are reversed, compared with the aforementioned case.

As described above, in the power supply starting system 1a of the first embodiment, a potential difference of positive or negative polarity that occurs at the start of input power supply is detected so that a transistor TR may be turned ON to fix the forced start signal K2 at L level. After the input voltages settle and the potential difference becomes insignificant, the transistor TR turns OFF and thus the forced start signal K2 is fixed at H, whereby the DC/DC converters 11-1 and 11-2 can be started normally.

Figure 4:
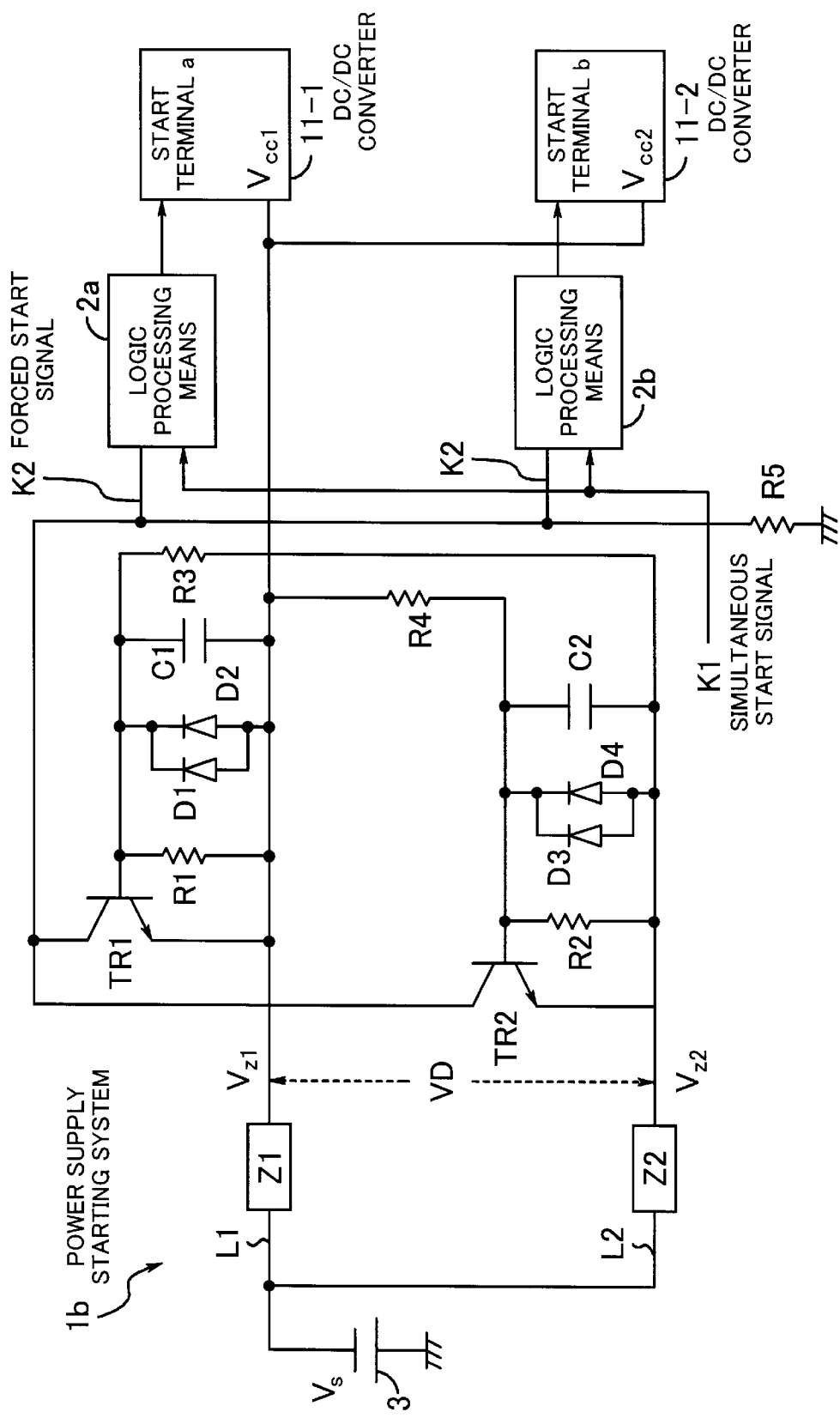
FIG. 4 is a diagram illustrating a configuration according to a second embodiment.

FIG. 4 illustrates a configuration according to a second embodiment. First, connections of individual elements of a power supply starting system 1b of the second embodiment will be explained. The negative power supply terminal of the battery 3 is connected to the emitter of a transistor TR1, one end of a resistor R1, the anodes of diodes D1 and D2, one end of a capacitor C1, one end of a resistor R4, the power supply ($V_{cc1}$) terminal of the DC/DC converter 11-1, and the power supply ($V_{cc2}$) terminal of the DC/DC converter 11-2.

Further, the negative power supply terminal of the battery 3 is connected to the emitter of a transistor TR2, one end of a resistor R2, the anodes of diodes D3 and D4, one end of a capacitor C2, and one end of a resistor R3. The positive power supply terminal of the battery 3 is connected to GND.

The base of the transistor TR1 is connected to the other end of the resistor R1, the cathodes of the diodes D1 and D2, the other end of the capacitor C1, and the other end of the resistor R3. The base of the transistor TR2 is connected to the other end of the resistor R2, the cathodes of the diodes D3 and D4, the other end of the capacitor C2, and the other end of the resistor R4.

The collector of the transistor TR1 is connected to the collector of the transistor TR2, the logic processing means 2a and 2b, and one end of a resistor R5. The other end of the resistor R5 is connected to GND. The logic processing means 2a and 2b are input with the simultaneous start signal K1, and the output signals therefrom, which are obtained by subjecting the simultaneous start signal K1 and the forced start signal K2 to logical operation, are supplied to the start terminals a and b of the DC/DC converters 11-1 and 11-2, respectively.

The diodes D1 to D4 are provided for the protection of the transistors TR1 and TR2 against their respective inverse voltages of $V_{BE}$. VD represents the potential difference between the voltages $V_{z1}$ and $V_{z2}$.

Figure 5:
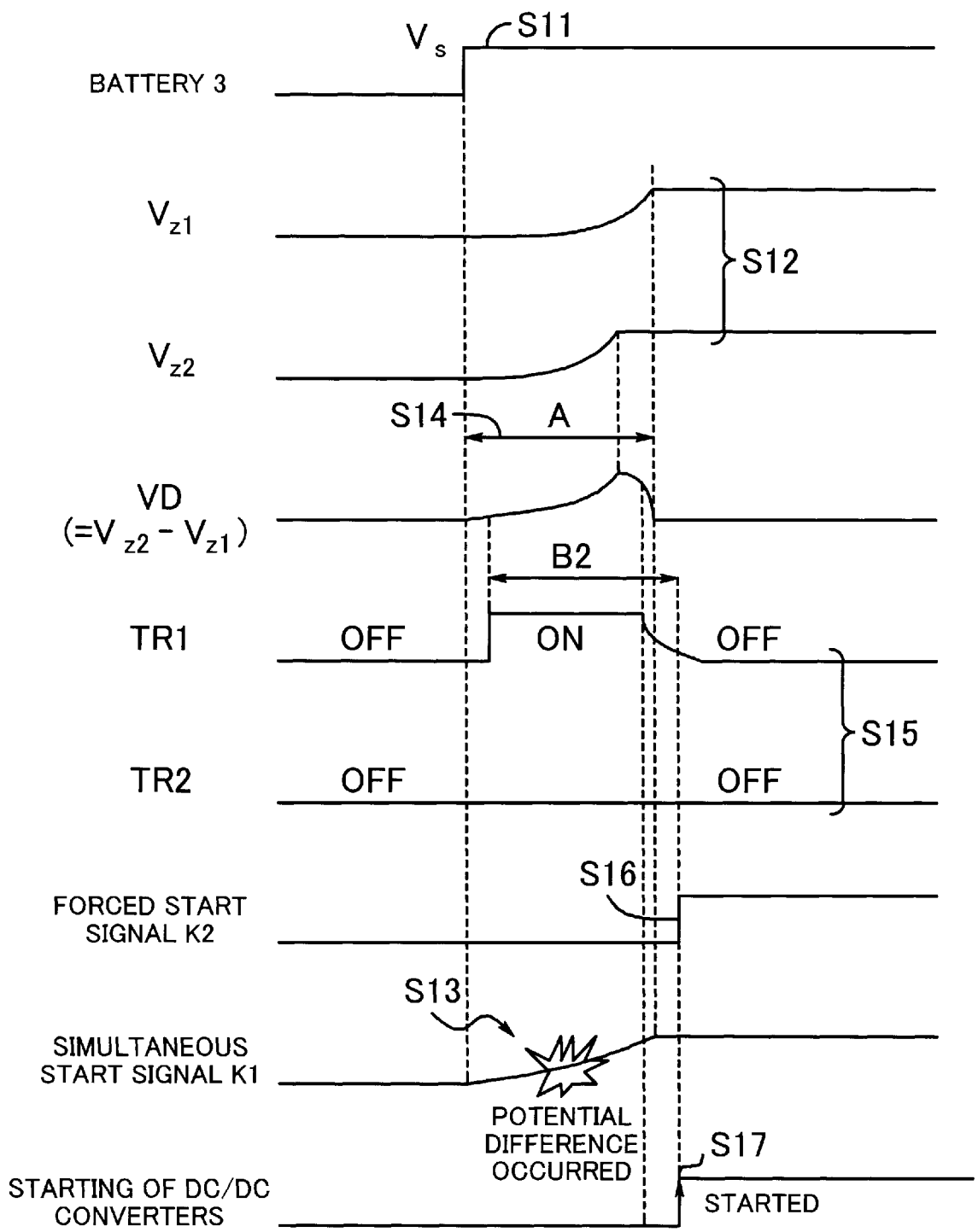
FIG. 5 is a time-based signal waveform chart illustrating operation according to the second embodiment.
Figure 6:
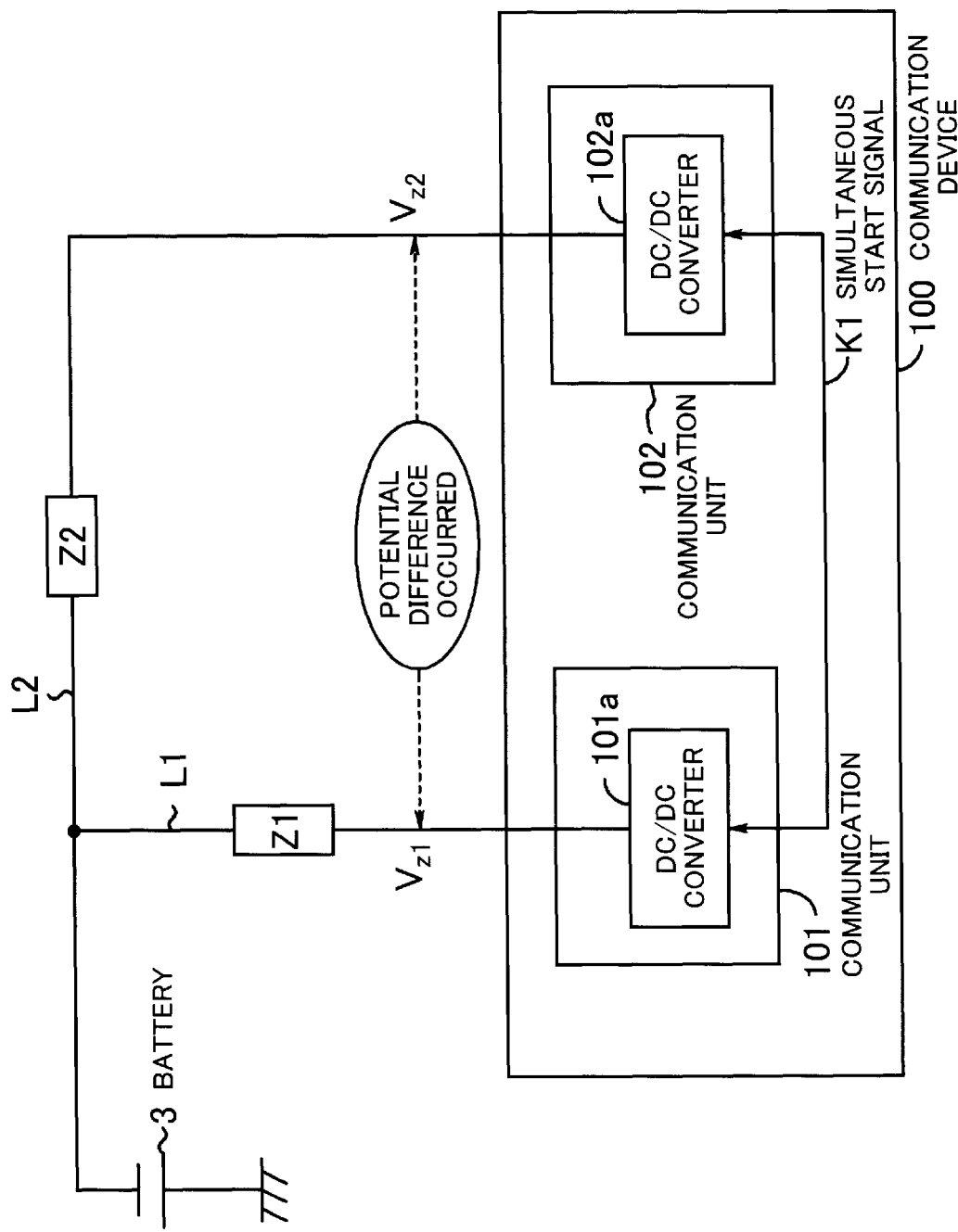
FIG. 6 is a diagram illustrating a configuration of a conventional distributed power supply system.

Operation will be now described. FIG. 5 is a time-based signal waveform chart illustrating the operation according to the second embodiment, wherein $V_{z1}<Vz_{z2}$ holds.

[S11] The battery 3 is switched ON ($0 \rightarrow V_s$).

[S12] Since $V_{z1}<V_{z2}$, $V_{z2}$ rises to a constant level earlier than $V_{z1}$.

[S13] The simultaneous start signal K1 starts to rise from the time the battery 3 is switched ON, and reaches a fixed level when $V_{z1}$ reaches the constant level.

[S14] Because of the difference $VD=V_{z2}-V_{z1}$, a potential difference occurs in interval A.

[S15] Due to the potential difference arising from the relation $V_{z1}<V_{z2}$, the transistor TR1 turns ON in interval B2 (The ON time is prolonged based on the time constant determined by the resistor R1 and the capacitor C1). The transistor TR2 remains OFF.

[S16] When the transistor TR1 switches from ON state to OFF state, the forced start signal K2 turns from L to H (enabled at H level).

[S17] In accordance with the result of logical operation on the simultaneous start signal K1 and the forced start signal K2, the logic processing means 2a and 2b start the respective DC/DC converters 11-1 and 11-2.

Where $V_{z1}>V_{z2}$, VD has the opposite polarity and the operations of the transistors TR1 and TR2 are reversed, compared with the aforementioned case.

As described above, in the power supply starting system 1b according to the second embodiment, while the potential difference exists because of the impedances Z1 and Z2, either the transistor TR1 or the transistor TR2 turns ON, thereby fixing the forced start signal K2 for the DC/DC converters at L level. After the potential difference becomes insignificant, the transistor TR1 or TR2 turns OFF, and the forced start signal is fixed at H since it is pulled up by the resistor R5.

Also, in the second embodiment, when the input power supply voltages become close to settlement and thus the potential difference becomes small, the transistor TR1 or TR2 starts to turn OFF, so that time compensation is achieved by the capacitor C1/C2. Further, the diodes D1 to D4 serve to relieve the inverse voltages of the transistors TR1 and TR2.

As described above, with the power supply starting system 1 of the present invention, when a potential difference between the input reference voltages is detected, the simultaneous start signal for the voltage converters is inactivated, and after the potential difference becomes insignificant, the voltage converters are forcedly started.

This makes it possible to prevent faulty starting from being caused at the time of simultaneous startup due to the physical disposition, internal wiring design, etc. of the DC/DC converters, whereby the quality and reliability of the system can be improved.

In the first and second embodiments described above, the system of the present invention is constructed using bipolar transistors, but field-effect transistors may be used instead.

As described above, in the power supply starting system of the present invention, when a potential difference between the input reference voltages is detected, the simultaneous start signal for the voltage converters is inactivated, and after the potential difference becomes insignificant, the voltage converters are forcedly started. This makes it possible to prevent faulty starting from being caused at the time of simultaneous startup and to improve the quality and reliability of the system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A power supply starting system for starting device power units, comprising:

a plurality of voltage converters each for transforming an input reference voltage and supplying a transformed voltage to a load element; and a start control section including simultaneous start signal generating means for generating a simultaneous start signal for simultaneously starting said voltage converters, potential difference detecting means for detecting a potential difference between the input reference voltages, and forced starting means for inactivating the simultaneous start signal if the potential difference is detected, and for forcedly starting said voltage converters after the potential difference becomes insignificant.

2. The power supply starting system according to claim 1, wherein said potential difference detecting means and said forced starting means utilize switching control by means of transistors to carry out the detection of the potential difference and the forced starting, respectively.

* * * * *